United States Patent [19]

Huang

[11] Patent Number: 5,019,161

[45] Date of Patent: May 28, 1991

[54] PROCESS FOR STRIPPING PLATED PLASTIC MATERIALS

[75] Inventor: Jong-Kang Huang, Hsinchu, Taiwan

[73] Assignee: Industrial Technology Research Institute, Taiwan

[21] Appl. No.: 352,283

[22] Filed: May 16, 1989

[51] Int. Cl.$^5$ .............................................. C23F 1/00
[52] U.S. Cl. ...................................................... 75/715
[58] Field of Search ......................................... 75/715

[56] References Cited

U.S. PATENT DOCUMENTS

| | | | |
|---|---|---|---|
| 2,937,940 | 5/1960 | Weisberg | 75/715 |
| 3,104,167 | 9/1963 | Cotteta | 75/715 |
| 4,022,638 | 5/1977 | Weet | 75/715 |
| 4,302,246 | 11/1981 | Brindisi | 75/715 |

*Primary Examiner*—Peter D. Rosenberg
*Attorney, Agent, or Firm*—Flehr, Hohbach, Test, Albritton & Herbert

[57] ABSTRACT

The present invention is a process for stripping coated plastic materials wherein the plastic is coated with a copper inner layer, and at least one outer layer formed of either nickel or chromium. Alternatively, the plastic can be coated with at least two outer layers formed of nickel and chromium. The process employs a combination of physical and chemical processing. First, the plated plastic is crushed by mechanical means to form a plurality of plated plastic particles. These particles can then be scrubbed to remove the nickel and/or chromium outer layers from the copper-coated plastic material. The nickel and/or chromium layers can be separated from the copper-coated plastic material. The copper-coated plastic material is treated with a chemical solution to dissolve the copper inner layer. the copper metal is thus separated from the plastic material. The chemical solution used to dissolve the cooper inner layer can be regenerated to a form in which it can be reused to successively treat additional samples of copper-coated plastic material, once the nickel and/or chromium are removed from the plated plastic material.

18 Claims, 2 Drawing Sheets

PROCESS FOR STRIPPING PLATED PLASTIC MATERIALS

TECHNICAL FIELD

The present invention relates, in general, to a process for stripping plated plastic materials and, more particularly, relates to a process for stripping plated plastic materials which are coated with heavy metals.

BACKGROUND ART

In the chemical industry, it is desirable to recycle costly heavy metals used in various chemical processes, to reduce processing costs. Recycling heavy metals is also desirable because it reduces pollution of the environment.

Plastics which are plated with heavy metals are used in a variety of applications, including the semiconductor and construction industry. Plated plastics are also used for radio parts, automobiles and other vehicles, and decorative wares. These plastics can be stripped of their heavy metals, and the metals can be reclaimed for use in other applications.

The most common prior art process used to strip metals from plated plastics is a ferric chloride leaching process. The plated plastics used in this process typically are coated with three layers of heavy metals. The plastic material is coated with a copper inner layer, and the outer layers are comprised of nickel and chromium. FIG. 1 shows a diagrammatic illustration of the prior art method of stripping plated plastics by ferric chloride leaching.

In the prior art method, the plated plastics are first crushed into smaller particles. The heavy metals are then "leached" from the plastic or dissolved into solution by treatment with ferric chloride. Thus, all three layers of heavy metal, copper, chromium and nickel, are dissolved into solution with each other. This is represented by the redox Equations 1 and 2, shown below.

$$2Fe^{3+} + M^0 \rightarrow 2Fe^{2+} + M^{2+} \quad [1]$$
$$M^0 = Ni, Cu$$

$$3Fe^{3+} + M^0 \rightarrow 3Fe^{2+} + M^{3+} \quad [2]$$
$$M^0 = Cr$$

The plastic is stripped free of the metals, but the metals are not separated distinctly from each other. Therefore, the metals are not in a form in which they can be reused and the cost of separating them from each other is extremely high.

After leaching with ferric chloride, the copper in solution is cemented to low grade powder as represented by Equation 3 below.

$$Cu^{2+} + Fe^0 \rightarrow Fe^{2+} + Cu^0 \quad [3]$$

The chromium and nickel metals, however, fail to be separated effectively from each other due to their similar chemical properties. These metals accumulate in large quantities with each successive treatment of plated plastic sample by the ferric chloride solution. This results in heavy accumulation of nickel and chromium in the spent liquor of the process, causing accumulation of toxic pollutants.

After the cementation step, the spent ferrous chloride liquor is chlorinated to regenerate a ferric chloride solution as shown by Equation 4 below.

$$2Fe^{2+} + Cl_2 \rightarrow 2Fe^{3+} + 2Cl^- \quad [4]$$

The ferric chloride solution can then be reused to treat successive plated plastics and strip heavy metals from them.

The prior art ferric chloride method has several disadvantages. The valuable metals of nickel and chromium are unable to be separated distinctly and economically from each other. In addition, due to the heavy pollutants which result in ferric chloride processing, this method is very costly.

Accordingly it is an object of the present invention to provide a process for stripping plated plastics in which heavy metals are separated from each other and recovered in a form which can be reused in other chemical processes.

Another object of the present invention is to provide a process for stripping plated plastics which reduces pollution of the environment.

It is a further object of the present invention to provide a process for stripping plated plastics which is less costly than prior art methods.

It is a further object of the present invention to provide a process for stripping plated plastics in which heavy metals can be reclamated in high yield without chemical processing, thereby making the process more economical.

The process for stripping plated plastics of the present invention has other objects and features of advantage which will become apparent from, or are set forth in more detail in, the accompanying drawings and the following description of the Best Mode of Carrying Out the Invention.

DISCLOSURE OF INVENTION

The present invention is a process for stripping coated plastic materials wherein the plastic is coated with a copper inner layer, and at least one outer layer formed of either nickel or chromium. Alternatively, the plastic can be coated with at least two outer layers formed of nickel and chromium. The process employs a combination of physical and chemical processing, rather than the prior art method of stripping heavy metals from plastic solely by chemical leaching.

The process of the present invention is comprised of several steps as follows. First, the plated plastic is crushed by mechanical means to form a plurality of plated plastic particles. These particles can then be scrubbed to remove the nickel and/or chromium outer layers from the copper-coated plastic material. The nickel and/or chromium layers are separated from the copper-coated plastic material. The copper-coated plastic material is treated with a chemical solution to dissolve the copper inner layer. In this manner, the copper metal is separated from the plastic material. The chemical solution used to dissolve the copper inner layer can be regenerated to a form in which it can be reused to successively treat additional samples of copper-coated plastic material, once the nickel and/or chromium are removed from the plated plastic.

BEST MODE OF CARRYING OUT THE INVENTION

In one aspect, the present invention is a process for stripping plated plastic material wherein the plastic is plated with a copper inner layer and at least one outer layer formed of either nickel or chromium. In an alternative embodiment, the plastic can be plated with at least two outer layers formed of nickel and chromium.

Figure 1:
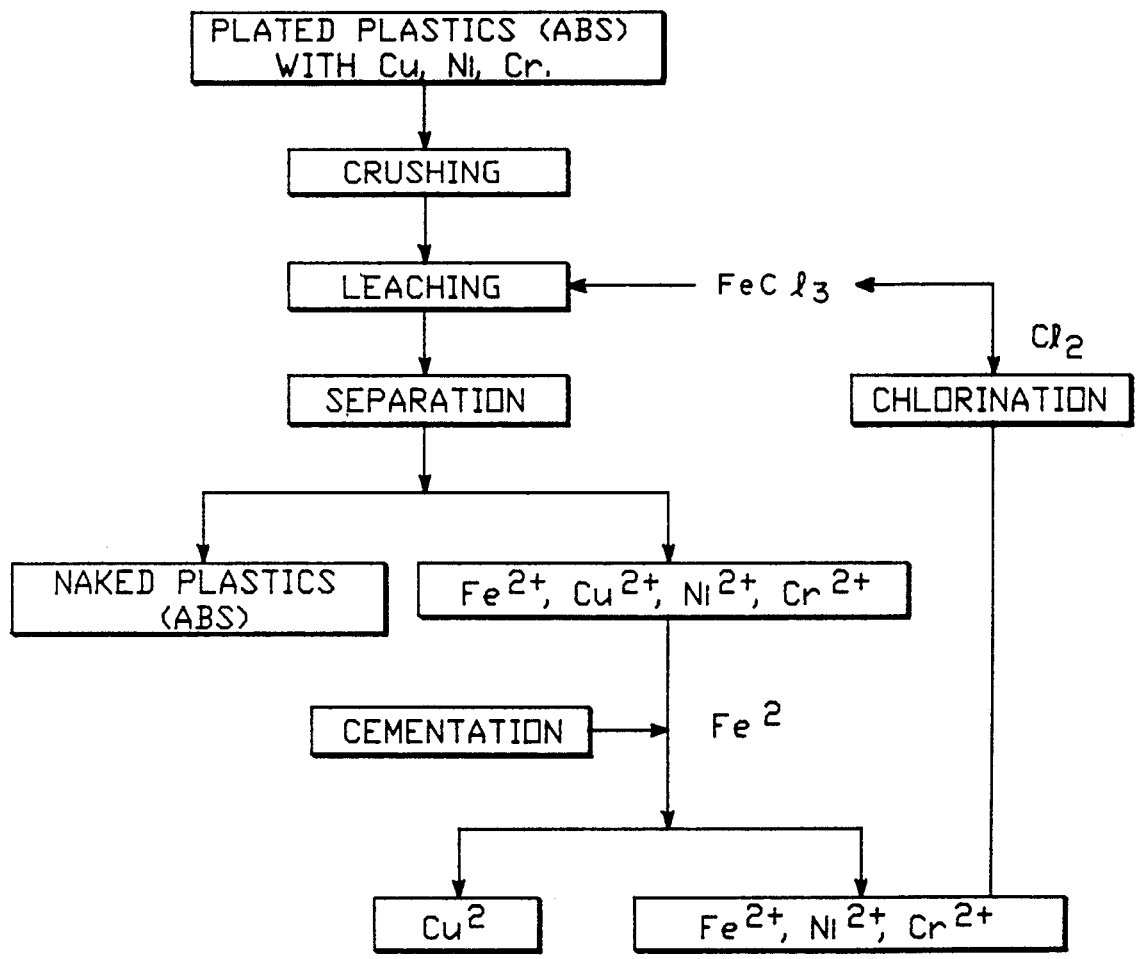
FIG. 1 is a diagrammatic illustration of the prior art ferric chloride process for stripping plated plastics.
Figure 2:
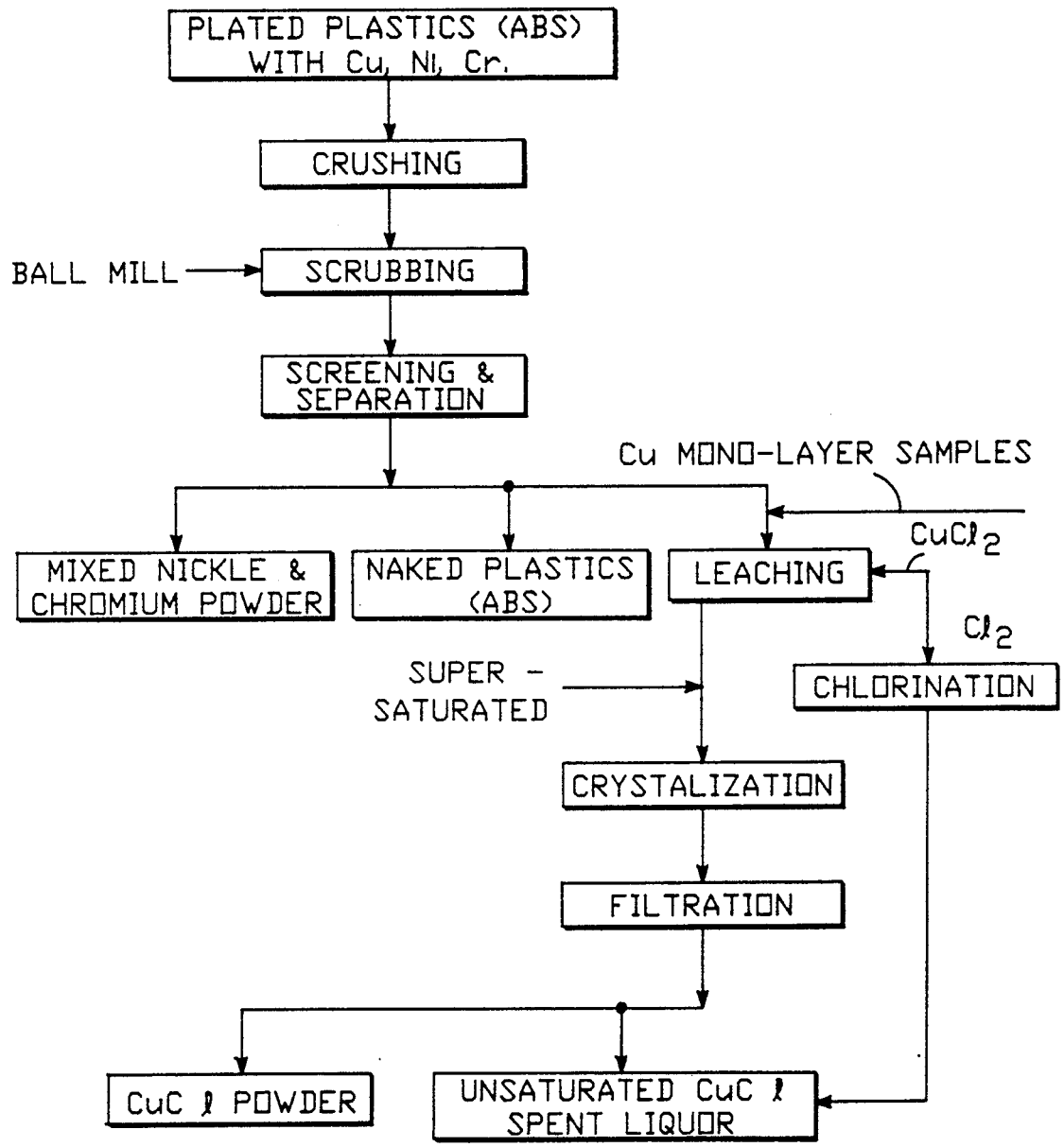
FIG. 2 is a diagrammatic illustration of the process of the present invention for stripping plated plastics.

Referring now to FIG. 2, a preferred embodiment of the process of the present invention is shown. The plastic material can be formed of any plastic which is capable of being coated with copper. Examples of suitable plastics are acrylonitrile-butadienestyrene, polyvinylchloride, or polyethylene. One preferred plastic is acrylonitrile-butadiene-styrene, which is a thermoplastic resin that can be heated and softened innumerable times without suffering any basic alteration in characteristics. This is of great advantage in forming a wide variety of products by fabrication methods such as casting, molding or extruding since the thermoplastic resins have great flexibility in withstanding heat, pressure or both.

The plastic material can be plated with a copper inner layer, and at least one outer layer formed of nickel or chromium. In one preferred embodiment, the plated plastic material of the present invention comprises between about 90% to about 92% plastic, between about 4.4% to about 5.5% copper, and between about 3.6% to about 4.5% chromium, by weight.

In another preferred embodiment, the plated plastic material of the present invention comprises between about 90% to about 92% plastic, between about 4.4% to about 5.5% copper, and between about 3.6% to about 4.5% nickel, by weight.

Alternatively, the plastic can be plated with a copper inner layer, and two successive outer layers formed of nickel and chromium. In this embodiment, the plated plastic material comprises between about 90% to about 92% plastic, between about 4.0% to about 4.4% copper, between about 3.4% to about 3.7% nickel and between about 0.16% to about 0.4% chromium, by weight.

The plated plastic material can be crushed by mechanical means to form a plurality of plated plastic particles, thereby decreasing particle size. This permits increased surface per unit volume of solids, which is favored by forming particles of decreased size. The increased surface per unit volume makes dissolving heavy metals from the plastic more efficient. The crushing can be done by conventional mechanical means, such as by use of a ball mill or jaw crusher.

The particles can then be scrubbed by mechanical means to remove the outer nickel and/or chromium layers from the copper-coated plastic material. This can be accomplished, for example, by use of a wet ball mill, sand scrubber, or vibration mill. The copper layer is not removed by conventional mechanical means, such as by use of a ball mill, since it is far more malleable than the nickel or chromium.

The nickel and/or chromium layers can then be separated from the copper-coated plastic material. For example, vibration screening in a water stream can be employed. If both nickel and chromium layers are used, the nickel and chromium powder can be separated from the plastic coated with copper by centrifugation. Chromium and/or nickel powder is obtained by this screening and separation method.

In a preferred embodiment, the copper-coated plastic material is chemically treated with a solution of cupric chloride to dissolve the copper inner layer from the plastic material. In its most preferred embodiment, the cupric chloride solution comprises an 18-25% cupric chloride solution, having a solubility of 30-35% by weight.

The spent liquor solution resulting from separation of copper from the plastic material will be formed of an unsaturated cuprous chloride solution. This solution can be recycled to successively treat other plated plastics using the same steps thus far described above. By chlorinating the unsaturated cuprous chloride solution, a cupric chloride solution can be formed. Thus, the spent liquor cuprous chloride is regenerated to a cupric chloride solution and can be used to successively treat additional plated plastics in the manner described above. With successive treatments of plated plastic samples, the cuprous chloride solution will become increasingly saturated. Upon saturation, cuprous chloride crystals will precipitate out of the saturated solution, thereby separating the copper metal, as a sole species, from the plastic material. The cuprous chloride precipitate can be separated from the spent liquor, for example, by filtration, thereby reclaiming the valuable copper from the plated plastic.

The process of the present invention has many advantages over the prior art ferric chloride method of stripping plated plastics. The process decreases pollution of the environment and reduces the cost of processing. The valuable nickel and chromium metals can be reclaimed in high yield without chemical processing, thereby shortening treatment time and reducing processing costs. In addition, the copper is recovered as cuprous chloride, which is easily purified to copper, since it is the sole species left in the spent liquor and is free from contamination by other heavy metals.

The following Examples are illustrative of the claimed process:

EXAMPLE 1

Stripping of Nickel and Chromium Layers and Leaching of Copper from Plated Plastic Three kilograms of crushed plated plastics formed of acrylonitrile-butadiene-styrene, coated with a copper inner layer and successive nickel and chromium outer layers, were subjected to mechanical scrubbing by a conventional wet ball mill for 5 hours. After vibration screening in a water stream and separating the nickel and chromium from the copper-coated plastic by centrifugation, 135 grams of a mixture of nickel and chromium powder were obtained. The copper-coated plastic samples were then fed into 15 liters of a 20% cupric chloride solution at room temperature. 2.65 kilograms of naked plastic were reclamated after 15 minutes of agitation with cuprous chloride leachant solution. No crystallization of cuprous chloride was obtained at this stage since the spent liquor was in an unsaturated state.

EXAMPLE 2

Separation of Copper from Plastic and Regeneration of Cupric Chloride Solution from Spent Liquor The unsaturated cuprous chloride solution (spent liquor) of Example 1 was regenerated to a cupric chloride solution by chlorinating the solution with a stream of chlorine gas at a rate of 250 cc/min. for 6 hours. The resultant cupric chloride solution was reused, as described in Example 1, to treat a new batch of plated plastic samples. After six successive cycles of treatment of plated plastics with regenerated cupric chloride solution, white crystals of cuprous chloride developed gradually throughout the entire leachant solution, and with heavy turbidity after eight successive cycles of treatment of plated plastic materials according to Example 1. Thus, after eight successive treatments of 3 kilogram samples of crushed plated plastics, 875 grams cuprous chloride powder were obtained.

EXAMPLE 3

Regeneration of Cupric Chloride Solution From Spent Liquor

The cupric chloride solution regenerated from Example 2 was used again as described in Example 1 to treat a new batch of plated plastic samples. Saturation of the cuprous chloride solution appeared after 8 successive treatments of 3 kiloqram samples of Crushed plated plastics. After more than 11 successive sample treatments, the cuprous chloride solution was supersaturated, indicating the decay of regenerated solution.

I claim:

1. A process for stripping a coated plastic material wherein said plastic is coated with a copper inner layer, and at least one outer layer formed of either nickel or chromium, comprising:
   a) crushing said plated plastic to form a plurality of plated plastic particles;
   b) scrubbing said particles to remove one of said nickel and chromium from said plated plastic material, leaving a copper-coated plastic material;
   c) separating one of said nickel and chromium from said copper-coated plastic material;
   d) chemically treating said copper-coated plastic material of step (c) with a chemical solution to dissolve said copper inner layer from said plastic material;
   e) separating said copper.. from said plated plastic material;
   f) regenerating said chemical solution of step (d) to a form in which it can be reused to successively treat additional samples of said copper-coated plastic material of step (d).

2. The process of claim 1 wherein said coated plastic material is coated with at least two outer layers formed of nickel and chromium.

3. The process of claim 2 wherein said plated plastic material comprises between about 90% to about 92% plastic, between about 4.0% to about 4.4% copper, between about 0.16% to about 0.4% chromium, and between about 3.4% to about 3.7% nickel, by weight.

4. The process of claim 1 wherein said plated plastic material comprises between about 90% to about 92% plastic, between about 4.4% to about 5.5% copper, and between about 3.6% to about 4.5% chromium, by weight.

5. The process of claim 1 wherein said plated plastic material comprises between about 90% to about 92% plastic, between about 4.4% to about 5.5% copper, and between about 3.6% to about 4.5% nickel, by weight.

6. The process of claim 1 wherein said plastic material is selected from the group consisting of acrylonitrile-butadiene-styrene, polyvinylchloride, and polyethylene.

7. The process of claim 1 wherein said scrubbing of step (b) is performed by use of a wet ball mill, sand scrubber, or vibration mill.

8. A process for stripping a plated plastic material wherein said plastic is coated with a copper inner layer and at least one outer layer formed of either nickel or chromium, comprising:
   a) crushing said plated plastic to form a plurality of plated plastic particles;
   b) scrubbing said particles to remove one of said nickel and chromium from said plated plastic material, leaving a copper-coated plastic material;
   c) separating one of said nickel and chromium from said copper-coated plastic material;
   d) treating said copper-coated plastic material of step (c) with a cupric chloride solution to dissolve said copper inner layer from said plastic, thereby forming an unsaturated cuprous chloride solution and a naked plastic;
   e) chlorinating said unsaturated cuprous chloride solution to form a cupric chloride solution;
   f) successively repeating steps (a)–(d), using said cupric chloride solution of step (e) to treat said copper-coated plastic material of step (d), until said unsaturated cuprous chloride solution of step (d) becomes saturated, forming a cuprous chloride precipitate; and
   g) separating said cuprous chloride precipitate of step (f) from said cuprous chloride solution.

9. The process of claim 8 wherein said coated plastic material is coated with at least two outer layers formed of nickel and chromium.

10. The process of claim 9 wherein said plated plastic material comprises between about 90% to about 92% plastic, between about 4.0% to about 4.4% copper, between about 0.16% to about 0.4% chromium and between about 3.4% to 3.7% nickel, by weight.

11. The process of claim 8 wherein said plated plastic material comprises between about 90% to about 92% plastic, between about 4.4% to about 5.5% copper, and between about 3.6% to about 4.5% chromium, by weight.

12. The process of claim 8 wherein said plated plastic material comprises between about 90% to about 92% plastic, between about 4.4% to about 5.5% copper, and between about 3.6% to about 4.5% nickel, by weight.

13. The process of claim 8 wherein said plastic material is selected from the group consisting of acrylonitrile-butadiene-styrene, polyvinylchloride, and polyethylene.

14. The process of claim 8 wherein said scrubbing of step (b) is performed by use of a wet ball mill, sand scrubber, or vibration mill.

15. The process of claim 8 wherein said separating of step (g) is performed by filtering said cuprous chloride precipitate out of said cuprous chloride solution.

16. A method of claim 1, step d, wherein said chemical solution comprises a non-acid, non-nitro solution.

17. A method of claim 1, step d, wherein said chemical solution comprises a cupric chloride solution.

18. A method of claim 1, step f, wherein said regeneration is accomplished through chlorination.

* * * * *